UNITED STATES PATENT OFFICE.

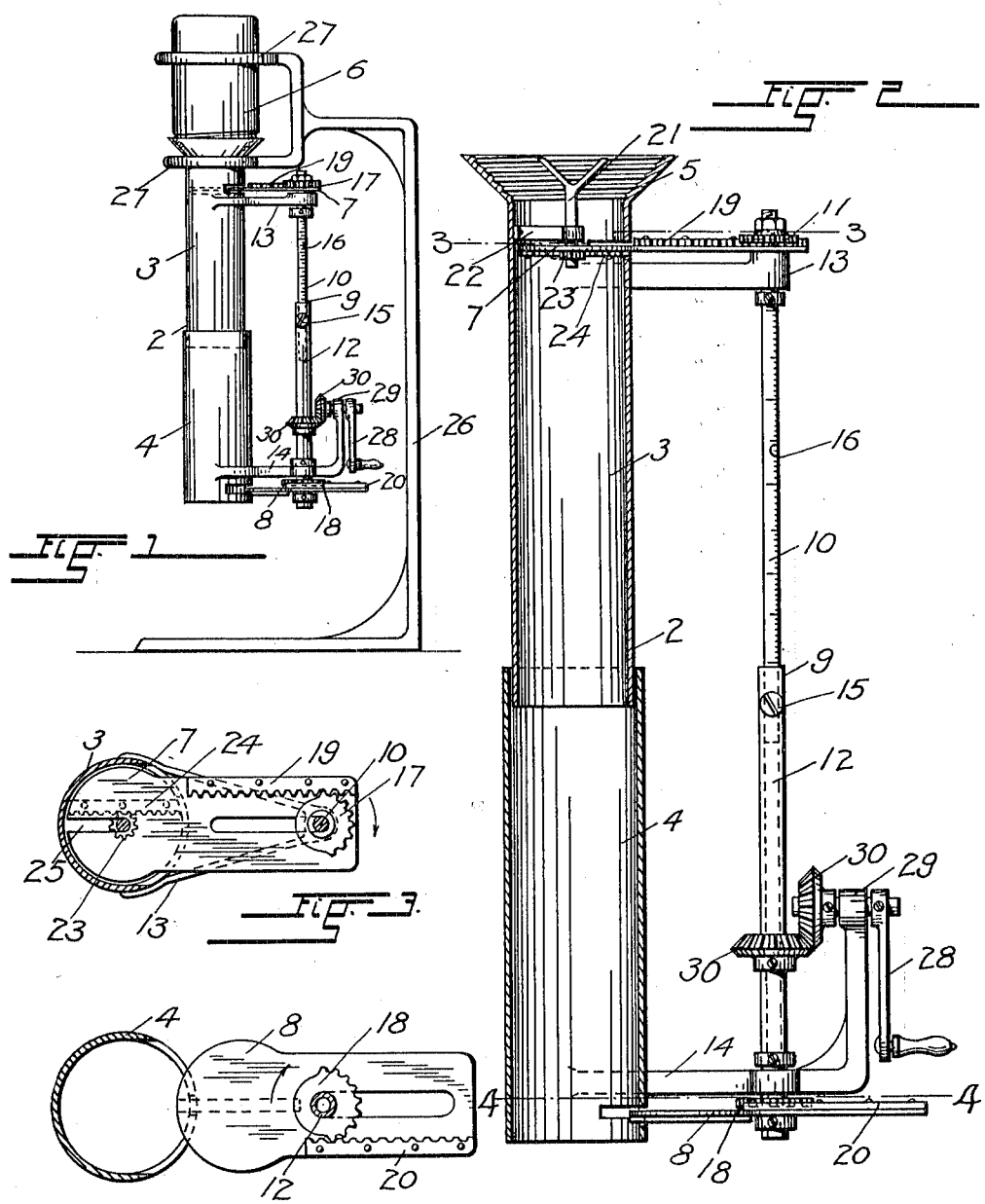

WILLIAM WEST AND LEONARD C. GOFF, OF DENVER, COLORADO.

DISPENSING DEVICE.

1,105,732.  Specification of Letters Patent.  Patented Aug. 4, 1914.

Application filed August 7, 1912. Serial No. 713,843.

*To all whom it may concern:*

Be it known that we, WILLIAM WEST and LEONARD C. GOFF, citizens of the United States, residing at Denver, in the county of Denver and State of Colorado, have invented certain new and useful Improvements in Dispensing Devices, of which the following is a specification.

Our invention relates to a device for dispensing granular or powdered substances and its object resides in the provision of an appliance of simple construction by the use of which the contents of a jar or other vessel are delivered in determinate equal portions, which may be varied in quantity by adjustment of the parts of which the appliance is composed.

We attain our object by the mechanism illustrated in the accompanying drawings in the various views of which like parts are similarly designated and in which, Figure 1 represents a side elevation of the appliance in its operative position, Fig. 2, a vertical, axial section through the same drawn to an enlarged scale, Fig. 3, a section taken along the line 3—3, Fig. 2, and Fig. 4, a section taken along the line 4—4, Fig. 2.

Referring to the drawings, the numeral 2 designates an open ended conduit composed of two telescoping, tubular members 3 and 4, the upper one of which has at its upper end an outwardly flaring, internally threaded mouth piece by means of which the conduit is attached to the correspondingly threaded neck of a vessel 6 containing the substance to be dispensed.

The conduit 2 is provided near its upper and lower extremities with gates 7 and 8 which are slidably supported in slots formed in the walls of the two members 3 and 4 and which are connected with a mechanism which in its operation moves them successively in opposite directions to alternately open and close the conduit at the points at which they are disposed. This operating mechanism comprises a shaft 9 composed of two telescoping members 10 and 12 which are rotatably mounted in brackets 13 and 14 extending laterally from the two members of the conduit near their respective upper and lower ends.

A set screw 15 extending through a threaded aperture in the outer member 12 of the shaft, serves to secure the two members in their adjusted position with relation to each other and the inner member 10 is provided with a graduated scale 16 which by registration with the upper end of the outer member, indicates the variable capacity of the conduit the members of which move in unison with those of the shaft with which they are respectively connected by means of the brackets 13 and 14.

The shaft 9 carries at its upper and lower ends, segmental gears 17 and 18 which mesh with racks 19 and 20 secured to the portions of the gates 7 and 8 extending exteriorly of the conduit, the said gates being provided with slots through which the shaft loosely extends and which permit their movement through the slots in the members 3 and 4 in which they are respectively supported.

A forked stirring device 21, disposed in the mouth 5 of the upper member of the conduit, is rotatably mounted in a bracket 22 extending from the interior surface of the same and it carries at its lower extremity, a pinion 23 which meshes with a rack 24 on the upper one of the two gates so that when by rotation of the shaft 9 the said gate is moved in one direction or the other, the stirring device will be rotated about its axis to agitate the contents of the vessel 6 and thereby assure their movement into the conduit when the gate 7 which has a slot 25 through which the said device extends, is moved outwardly and which when the gate is in the closed position is covered by the bracket 22 to prevent the material in the container 6 from flowing into the conduit 2.

The dispensing appliance and the vessel 6 with which it is connected are preferably supported on a standard 26 which at its upper extremity has two resilient forks 27 which embrace the vessel and the upper member of the conduit, and a crank 28 rotatably mounted in a bearing 29 on the lower bracket 14 is provided to impart a rotary movement to the shaft through the instrumentality of a pair of beveled gear wheels 30.

In the operation of our invention the lower member of the conduit and the therewith connected member 12 of the shaft 9 are adjusted with relation to the other members of the respective parts to regulate the capacity of the conduit in accordance with the quantity of the portions in which the contents of the vessel are to be dispensed, as indicated on the scale 16 and the said members are secured in their adjusted position by means of the set screw 15. When the parts are in their normal position the upper gate closes the conduit at its upper end to prevent the passage of the contents of the vessels 6 thereinto and the lower gate is opened as is shown in the drawings. The segmental gears are, when the parts are in this position, in engagement with the respective racks at opposite ends thereof, so that when by manipulation of the crank, the shaft is rotated in the direction of the arrow shown in Figs. 3 and 4, the lower gate is first moved inwardly to close the conduit at its lower end before the upper gate is moved outwardly to permit the contents of the vessel to enter the conduit. The substance delivered from the vessel thus falls upon the lower gate until the entire conduit above the same has been filled, when by rotating the shaft in the opposite direction, the upper gate is first closed and the lower gate subsequently opened to deliver the contents of the conduit into a receptacle placed beneath its lower end.

Having thus described our invention what we claim and desire to secure by Letters-Patent is:

1. A device of the class described comprising an open-ended conduit, a shaft rotatably mounted thereon, sliding gates adapted to open and close said conduit at different points, racks on said gates, and segmental gears fixed on said shaft to operatively engage said racks, and relatively disposed to move said gates successively in opposite directions.

2. A device of the class described comprising an open-ended conduit composed of two telescoping members, a shaft rotatably mounted on said conduit and composed of two adjustably connected members mounted on the two members of the conduit, respectively, means for securing the members of said conduit and said shaft in their adjusted position with relation to each other, gates adapted to open and close the said conduit at different points, and mechanism for converting a rotary movement of said shaft into successive movements of said gates in opposite directions.

3. A device of the class described comprising an open-ended conduit composed of two telescoping members, a shaft rotatably mounted on said conduit and composed of two adjustably connected members mounted on the two members of the conduit, respectively, means for securing the members of said conduit and said shaft in their adjusted position with relation to each other, gates adapted to open and close the said conduit at different points, and mechanism for converting a rotary movement of said shaft into successive movements of said gates in opposite directions, one of the members of said shaft having graduations to indicate the capacity of the portion of said conduit between the two gates, by registration with an end of the other member of the same.

4. A device of the class described comprising an open-ended conduit composed of two telescoping members, a shaft rotatably mounted on said conduit and composed of two adjustably connected members mounted on the two members of the conduit, respectively, means for securing the members of the said shaft in their adjusted position with relation to each other, gates adapted to open and close the said conduit at different points, and mechanism for converting a rotary movement of said shaft, into successive movements of said gates in opposite directions.

In testimony whereof we have affixed our signatures in presence of two witnesses.

WILLIAM WEST.
LEONARD C. GOFF.

Witnesses:
F. H. Cuno,
S. Rhoades.

Copies of this patent may be obtained for five cents each, by addressing the "Commissioner of Patents, Washington, D. C."